United States Patent Office 3,394,172
Patented July 23, 1968

3,394,172
PERHYDRATES OF NITROGEN-CONTAINING PHOSPHONIC ACIDS AND PROCESS FOR THEIR MANUFACTURE
Joachim Schiefer, Opladen-Lutzenkirchen, Germany, assignor to Henkel & Cie, GmbH, Dusseldorf-Holthausen, Germany
No Drawing. Filed Oct. 18, 1965, Ser. No. 497,484
Claims priority, application Germany, Feb. 25, 1965, H 55,307
6 Claims. (Cl. 260—502.5)

ABSTRACT OF THE DISCLOSURE

Perhydrates of alkali- and alkaline earth salts of water-soluble alpha-aminophosphonic acids having the characteristic group

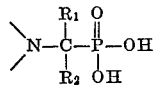

wherein $R_1$ and $R_2$ are hydrogen or lower alkyl. The perhydrates are produced by the reaction of the salts with hydrogen peroxide at temperatures below 70° C., preferably at 40–60° C. These perhydrates are stable on prolonged storage, are water-soluble and valuable as bleaching, rinsing and cleansing agents.

---

The invention relates to novel perhydrates of nitrogen-containing phosphonic acids and to a process for the manufacture of these compounds.

It has been found that industrially valuable perhydrates are produced by the reaction of the alkali- and/or alkaline earth salts of water-soluble alpha-aminophosphonic acids, substituted on the nitrogen atom, with hydrogen peroxide at temperatures below 70° C., and preferably at 40 to 60° C.

The alpha-amino phosphonic acids described contain the characteristic group 1:

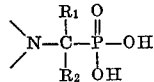

wherein $R_1$ and $R_2$ denote hydrogen or a lower alkyl. The chain length of the lower alkyls preferably is 1 to 4 carbon atoms. The substituents on the nitrogen atom must not be so strongly hydrophobic that the water solubility of the compound is adversely influenced. Preferably, short-chain hydrocarbon radicals are employed which carry further acid groups.

Particularly advantageous is the employment of alpha-aminophosphonic acids of Formula 2:

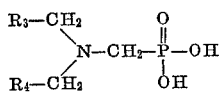

wherein $R_3$ and $R_4$ preferably are a phosphono- or a carboxyl group or a radical of the Formula 3:

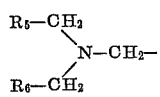

and $R_5$ and $R_6$ are a phosphono- or a carboxyl group, and wherein $R_3$ and $R_4$ as well as $R_5$ and $R_6$ may be alike or different from each other. Especially those alpha-aminophosphonic acids are used which contain several phosphorus atoms in their molecules.

Preferred is aminotrimethylphosphonic acid which is an inexpensive and readily available starting material and which gives very good yields in the reaction according to the invention.

Another preferred embodiment is the reaction product of bis-N-(phosphonylmethyl)-aminoacetic acid with hydrogen peroxide because this material has particularly high contents of active oxygen.

The alpha-aminophosphonic acids themselves are produced according to processes known per se.

The alpha-aminophosphonic acids described above are used in the form of their alkali- and/or alkaline earth salts. The acid groups can be neutralized entirely or only partially, whereby all neutralization steps may be followed. It is feasible to use mixed alkali- and alkaline earth salts. Preferred are the sodium and potassium salts of the acids named.

The reaction with hydrogen peroxide can be carried out by mixing the alkali and/or alkaline earth salts in solid form, in suspension or in aqueous solution with $H_2O_2$. After thorough mixing, the excess water is removed by concentration. The removal of water and, if required, of the excess of $H_2O_2$ opportunely is accomplished in vacuo at temperatures below 70° C., whereby the temperature preferably is kept between substantially 40 and 60° C. At temperatures in excess of 70° C. the otherwise very stable perhydrates are apt to decompose. Lower temperatures can be employed, but it has been established that at temperatures of less than 20° C. the evaporation requires such a long period of time that it industrially is uneconomical to use these low temperatures.

It generally has been found advantageous to employ hydrogen peroxide solutions, when carrying out this process, which have a minimum concentration of 30 weight percent $H_2O_2$. Highly concentrated $H_2O_2$ solutions also can successfully be used, especially when working with suspensions. The quantity of $H_2O_2$ applied opportunely is calculated on the acid groups present in the molecule. Generally, the amount of hydrogen peroxide is 0.5 to 4 mols per acid groups. The upper limit is not critical, but a further excess of $H_2O_2$ does not lead to discernible technological advantages. Preferred quantities are 0.7 to 2 mols $H_2O_2$ per acid group.

The amount of active oxygen introduced does not only depend upon the excess of $H_2O_2$ but also upon the degree of neutralization of the alpha-aminophosphonic acid employed. As a rule, the active oxygen content becomes larger with increasing alkalinity of the salts.

The perhydrates produced according to the invention, depending upon the reaction conditions, contain up to 4 mols $H_2O_2$ per mol salt, or up to 11 weight percent active oxygen. This is the more surprising as the corresponding alpha-aminocarboxylic acids, under like conditions, form perhydrate compounds of very low oxygen content.

The novel perhydrates are stable in solid form for a long period of time without the addition of a further stabilizer and exhibit practically no loss of oxygen. Even upon storage at elevated temperatures, the loss of oxygen is but slight. The perhydrates are water-soluble and can serve in bleaching-, rinsing-, cleansing- and penetrating agents, if desired, in combination with other components known per se, such as phosphates, soda, water-glass and wetting agents or detergents.

Solid perhydrates of nitrogen-containing acid compounds have previously been manufactured (cf. U.S. 2,350,850). However, these known compounds are of different constitution from the ones according to the invention and are considerably inferior with regard to storability, as becomes evident from the comparative tests conducted and described hereinbelow, viz.:

In accordance with the process described in U.S. 2,-

350,850, a solid perhydrate of a nitrogen-phosphoric acid compound was produced with 30 weight percent $H_2O_2$, whose active oxygen content was determined as 11.5% (this is designated as "Test 1" in Table 1 below). The nitrogen-phosphoric acid had been produced according to the disclosure in German Patent 715,540, Example 2, and had a phosphorus content of 24.4%.

The perhydrate thus produced was compared with a perhydrate of the pentasodium salt of aminotrimethylphosphonic acid (see Example 1 below).

This perhydrate is designated "Test 2" in Table 1 below. 15 g. each of the two samples were stored 2, 5 and 8 days, respectively, at 60° C. under exclusion of moisture. The active oxygen contents determined after these time periods are listed in Table 1.

TABLE 1

| Storage at 60° (days) | Active Oxygen (Wt. percent) | | | |
|---|---|---|---|---|
| | Test 1 | Loss, percent | Test 2 | Loss, percent |
| 0 | 11.5 | | 9.8 | |
| 2 | 3.25 | 72.0 | 8.8 | 10.2 |
| 5 | 0.8 | 93.0 | 7.6 | 22.4 |
| 8 | 0.14 | 93.8 | 6.4 | 34.7 |

The invention now will be further explained by the following examples. However, it should be understood that these are given merely by way of illustration and not of limitation, and that numerous changes may be made in the details without departing from the spirit and the scope of the invention as hereinafter claimed.

Percentages are weight percent; solution are aqueous.

EXAMPLE 1

A recrystallized aminotrimethylphosphonic acid was used which exhibited pH jumps at 2 and 5 equivalents, respectively, (di- and penta salts). 29.9 g. each of this acid were converted into the mono-, di-, tri-, tetra-, penta- and hexasodium salts with the corresponding quantities of concentrated aqueous NaOH. Furthermore, sodium salt solutions of the acid were used containing 3.5 and 4.5 Na per mol substance.

The concentrated solutions of these salts were intimately mixed with 34 g. 60% $H_2O_2$ each, corresponding to 1 mol $H_2O_2$ per acid group, and concentrated at 50–55° C. in vacuo over $P_2O_5$. The active oxygen contents of the solid per-compounds thus formed and the pH values of their 1% aqueous solutions are compiled in Table 2.

TABLE 2

| Gram Atoms Na/mol Acid at Production of Salts | Solid Per Compound Active $O_2$ (Wt. Percent) | pH of 1% Aqueous Soln. of Per Compound |
|---|---|---|
| 0 | 0.23 | 1.65 |
| 1 | 1.60 | 1.85 |
| 2 | 5.02 | 2.74 |
| 3 | 6.64 | 4.61 |
| 3.5 | 8.01 | 5.50 |
| 4 | 8.37 | 6.53 |
| 4.5 | 8.94 | 7.18 |
| 5 | 9.90 | 8.21 |
| 6 | 10.10 | 10.79 |

EXAMPLE 2

299 g. aminotrimethylphosphonic acid were converted into the trisodium salt with the corresponding quantity of sodium hydroxide solution. The concentrated solution of the salt was reacted with 600 g. 40% $H_2O_2$. After thorough mixing, the solution obtained was concentrated in vacuo at 40° C. The solid perhydrate thus formed had an active oxygen content of 7.05% and corresponded to the composition of Formula 4:

$$N[—CH_2—P—(O)(OH)ONa]_3 \cdot 2H_2O_2 \quad (4)$$

(The calculated active oxygen content is 7.4%.)

EXAMPLE 3

41 g. anhydrous pentasodium salt of aminotrimethylphosphonic acid were suspended in 55 g. 30% hydrogen peroxide and then concentrated at 60° C. in vacuo over $P_2O_5$ to dryness. The yield of solid perhydrate of the composition $C_3H_7NO_9P_3Na_5 \cdot 3H_2O_2$ was 51 g. The active oxygen content was 9.5%, calculated 9.4%.

EXAMPLE 4

59.8 g. aminotrimethylphosphonic acid were dissolved in 200 ml. water and 11.7 g. magnesium hydroxide and 16 g. sodium hydroxide added. The suspension formed was concentrated on a water bath, 68 g. 60% $H_2O_2$ added, and the mixture dried at 50° C. in vacuo over $P_2O_5$.

93.5 g. magnesiumdisodiumaminotrimethylphosphonate triperhydrate thus were obtained which had an active oxygen content of 10.0% (calculated 10.27%). The yield was 100%. The pH value of a 1% aqueous solution was 5.7.

In the same manner, the dimagnesiumaminotrimethylphosphonate monoperhydrate was obtained, which had an active oxygen content of 4.0% (calculated 4.25%). The yield was 100%. The pH value of a 1% aqueous solution was 6.16.

EXAMPLE 5

72.7 g. ethylenediaminotetramethylphosphonic acid were dissolved in 120 g. water, and 84 g. 40% aqueous NaOH added (corresponding to the pentasodium salt). The solution was strongly concentrated on a water bath, then 70 g. stabilized hydrogen peroxide (80%) were added, and the mixture evaporated to dryness in vacuo at 50° C. over $P_2O_5$. The yield was 110 g. of a solid perhydrate of the composition $C_6H_{15}N_2O_{12}P_4Na_5 \cdot 4H_2O_2$. The active oxygen content was 8.95%, calculated 9.38%.

Like results were obtained when using a non-stabilized $H_2O_2$.

EXAMPLE 6

52.6 g. bis-N-(phosphonylmethyl)-aminoacetic acid were dissolved in 200 ml. water, 32 g. NaOH in 120 ml. water added, concentrated on a water bath, 80 g. $H_2O_2$ (60 weight percent) added and dried in vacuo at 40° C. over $P_2O_5$. 90 g. of a readily water-soluble compound were obtained having Formula 5:

$$HOOC—CH_2—N[—CH_2—P(O)(ONa)_2]_2 \cdot 3H_2O_2 \quad (5)$$

Active oxygen 10.75; calculated 10.6.

EXAMPLE 7

To 52.6 g. bis-N-(phosphonylmethyl)-aminoacetic acid 112 g. 40% aqueous KOH (corresponding to the tetrapotassium salt) were added, followed by 80 g. 40% $H_2O_2$. By concentration in vacuo at 65° C. over $P_2O_5$ to dryness, 98 g. of a perhydrate of the tetrapotassium salt of bis-N-(phosphonylmethyl)-aminoacetic acid were obtained having an active oxygen content of 8.1 weight percent. The compound corresponded to the composition $C_4H_7NO_8P_2K_4 \cdot 2.5H_2O_2$ (calculated active oxygen content 8.0%).

EXAMPLE 8

One sample each of the per-compounds of the tetra- and pentasodium salts of Example 1 (designated hereinbelow as "Tests 3 and 4," respectively) and of a pentasodium salt of ethylenediaminotetramethylphosphonic acid (designated "Test 5") were stored for 3 months in closed bottles at 20° C. The active oxygen contents prior to storage and after 3 months were determined by iodometric titration and are compiled in Table 3.

TABLE 3

| | Active $O_2$ (Wt. Percent) | | Loss, Percent |
|---|---|---|---|
| | Original | After 3 months | |
| Compound: | | | |
| Test 3 | 8.4 | 8.2 | 2.4 |
| Test 4 | 9.9 | 9.8 | 1.0 |
| Test 5 | 8.7 | 8.4 | 3.5 |

EXAMPLE 9

32 g. of a compound produced according to Example 5, having an active oxygen content of 8.95%, were dissolved in water, adjusted with ammonia to a pH of 10.0, and made up to 100 g. with water. This solution bleached a dark brown strand of hair to a medium blond within 30 minutes at room temperature.

The same effect was obtained using 35 g. of a perhydrate of the tetrapotassium salt of bis-N-(phosphonylmethyl)-aminoacetic acid, having an active oxygen content of 8.1 (produced according to Example 7), or by using 38.2 g. of a perhydrate of the trisodium salt of aminotrimethylphosphonic acid (according to Example 2), having an active oxygen content of 7.05.

EXAMPLE 10

45 g. of a commercial hair dyeing agent in cream form, containing fatty alcohol, fatty alcohol sulfate, water, and as dyes 1.5 weight percent p-toluylenediamine, 0.2% resorcinol and 0.04% m-diaminoanisol, were mixed with 4.1 g. of the perhydrate of the pentasodium salt of aminotrimethylphosphonic acid (active oxygen content 9.5, and produced according to Example 3). The cream was applied at room temperature to a completely greyed strand of human hair. The strand thereby assumed a dark brown color with good hiding power.

The same effect was obtained using 3 g. magnesiumdisodiumaminotrimethylphosphonate triperhydrate.

EXAMPLE 11

A strand of human hair was treated on a thin curler with a 6% aqueous thioglycolic acid, adjusted with ammonia to a pH of 9.5, for 30 minutes at 36° C. To fix the hair thus waved, one of the compounds named below was allowed to act thereon for 10 minutes at room temperature. In all instances, a strong, elastic wave of good durability was obtained.

The following compounds were used (the figure preceding the compound denotes weight percent of an aqueous solution; the last figure in parentheses the active oxygen content in weight percent):

(a) 10.5% perhydrate of the pentasodium salt of ethylenediaminetetramethylphosphonic acid (8.95);

(b) 10.0% perhydrate of the pentasodium salt of aminotrimethylphosphonic acid (9.5);

(c) 12.8% perhydrate of the trisodium salt of aminotrimethylphosphonic acid (7.05);

(d) 8.8% perhydrate of the tetrasodium salt of bis-N-(phosphonylmethyl)-aminoacetic acid (10.75);

(e) 11.7% perhydrate of the tetrapotassium salt of bis-N-(phosphonylmethyl)-aminoacetic acid (8.1).

I claim as my invention:

1. Perhydrates of alkali- and alkaline earth salts of alpha-aminophosphonic acids selected from the group consisting of ethylenediaminotetramethylphosphonic acid, aminotrimethylphosphonic acid and bis-N-(phosphonylmethyl)-aminoacetic acid.

2. A process for the manufacture of solid per-compounds of alkali- and alkaline earth salts of alpha-aminophosphonic acids having the formula

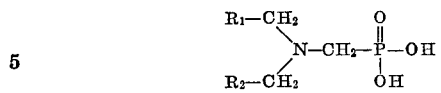

wherein $R_1$ and $R_2$ individually are selected from the group consisting of a phosphono group, a carboxyl group or a group having the constitution

$R_3$ and $R_4$ individually being selected from the group consisting of a phosphono- or a carboxyl group; which comprises reacting said salts with an aqueous hydrogen peroxide solution having a concentration of at least 30 percent, in proportions of 0.5–4 mols $H_2O_2$ per acid group; and concentrating the solutions thus obtained in vacuo at a temperature below 70° C.; the per-compounds thus formed having an active oxygen content of substantially 4 to 11 weight percent.

3. Perhydrates of salts selected from the group consisting of the tri- and pentasodium salts of aminotrimethylphosphonic acid having an active oxygen content of substantially 7.4 and substantially 9.4 weight percent, respectively, and the respective formulae $$N[-CH_2-P(O)(OH)ONa]_3 \cdot 2H_2O_2$$

and $$C_3H_7NO_9P_3Na_5 \cdot 3H_2O_2$$

4. The perhydrate of magnesiumdisodiumaminotrimethylphosphonate having an active oxygen content of substantially 10.2 weight percent and the formula $$C_3H_8NO_9P_3Na_2Mg \cdot 3H_2O_2$$

5. The perhydrate of the pentasodium salt of ethylenediaminetetramethylphosphonic acid having an active oxygen content of substantially 9.4 weight percent and the formula $C_6H_{15}N_2O_{12}P_4Na_5 \cdot 4H_2O_2$.

6. Perhydrates of salts selected from the group consisting of the tetrasodium and tetrapotassium salts of bis-N-(phosphonylmethyl)-aminoacetic acid having an active oxygen content of substantially 10.6 and substantially 8.0 weight percent and the respective formulae $$HOOC-CH_2-N[-CH_2-P(O)(ONa)_2]_2 \cdot 3H_2O_2$$

and $$C_4H_7NO_8P_2K_4 \cdot 2.5H_2O_2$$

References Cited

UNITED STATES PATENTS 3,234,140  2/1966  Irani _____ 260—500
3,288,846  11/1966  Irani et al. _____ 260—500

FOREIGN PATENTS 852,102  10/1960  Great Britain.
1,342,412  9/1963  France.

BERNARD HELFIN, *Primary Examiner.*

J. E. EVANS, *Assistant Examiner.*